Dec. 20, 1966   J. A. HARPER   3,293,579
LIQUID LEVEL INDICATOR INCORPORATING PERMANENT MAGNETS
Filed April 23, 1965   3 Sheets-Sheet 1

INVENTOR
Jay A. Harper
By Smyth, Roston & Pavitt
Attorneys

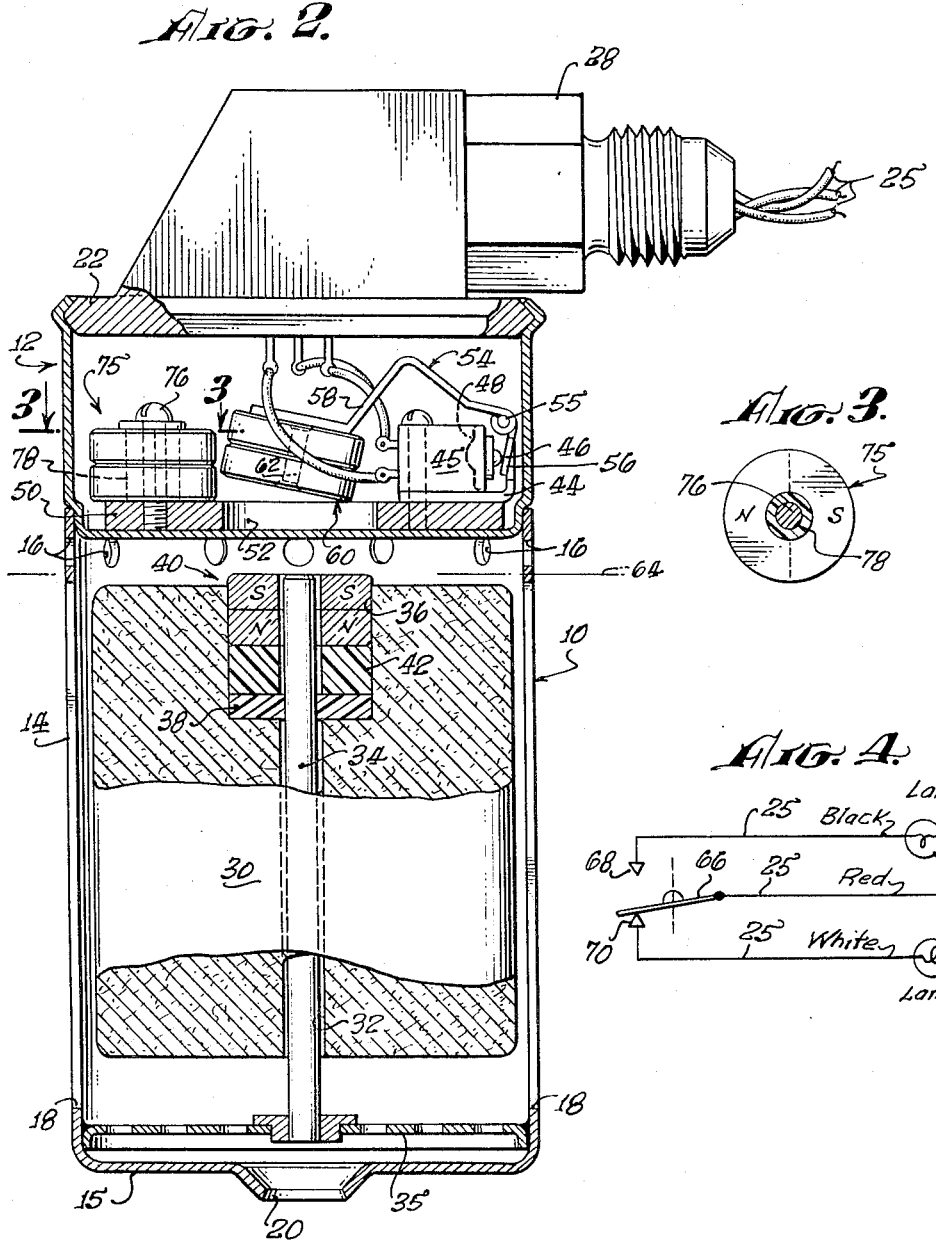

Dec. 20, 1966    J. A. HARPER    3,293,579
LIQUID LEVEL INDICATOR INCORPORATING PERMANENT MAGNETS
Filed April 23, 1965    3 Sheets-Sheet 3
*FIG. 5.*
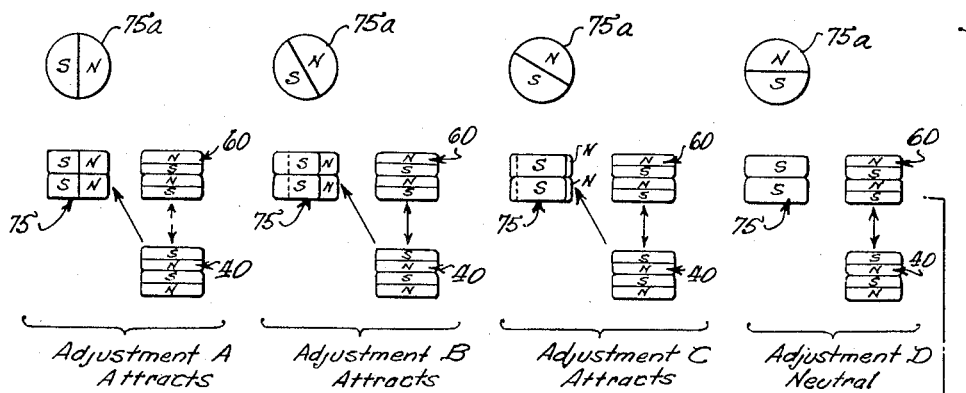
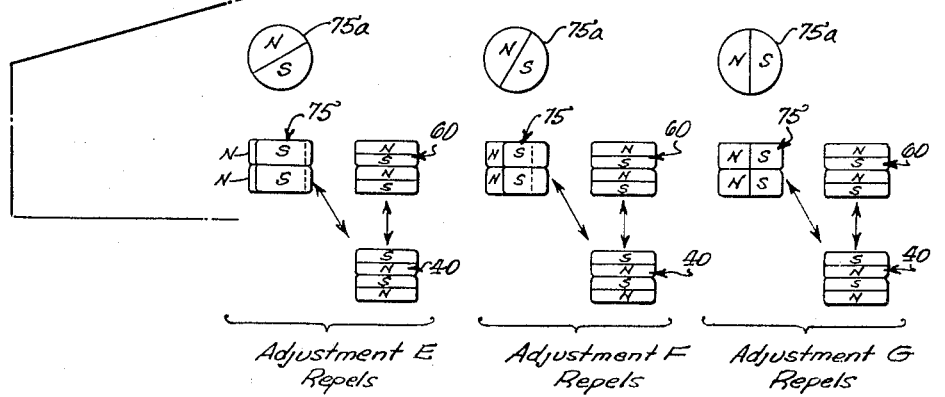
INVENTOR.
Jay A. Harper
By Smyth, Roston & Pavit
Attorneys.

United States Patent Office 3,293,579
Patented Dec. 20, 1966

3,293,579
LIQUID LEVEL INDICATOR INCORPORATING PERMANENT MAGNETS
Jay A. Harper, Gardena, Calif., assignor to Acme Machine Works, Inc., Hawthorne, Calif., a corporation of California
Filed Apr. 23, 1965. Ser. No. 450,358
12 Claims. (Cl. 335—207)

This invention relates in general to means to detect the arrival of a movable member at a predetermined position and has special utility where there is reason to seal off the detection means from the environment of the movable member.

The initial embodiment of the invention is a liquid level indicator which incorporates means to detect the rise of a float to a predetermined level, the detecting means being sealed off from the liquid that carries the float. The disclosure herein of this particular embodiment of the invention will provide adequate guidance for those skilled in the art who may have occasion to apply the same basic principles to other specific purposes.

One problem to which the invention is directed is to provide detection means which will be operative if the detection means is in a chamber that is sealed off from the float by a solid continuous wall, as distinguished from a yielding diaphragm, and which does not incorporate any soft or vulnerable members such as elastomeric sealing rings. This problem is solved by employing a first movable permanent magnet means in the sealed chamber in cooperation with a second permanent magnet means carried by the float, the two permanent magnet means being separated by a solid chamber wall of non-magnetic material. The magnetic force between the two permanent magnet means varies with changes in distance between the two permanent magnet means, and detection of arrival of the float at a critical predetermined position is accomplished by detecting the consequent change in magnitude of the magnetic force. Under this concept the magnetic force in effect between the two permanent magnet means may either be a force of attraction between unlike poles or a repellent force between like poles. In the present embodiment of the invention, the magnetic force between the two permanent magnet means is repellent force.

When the float rises to the critical or predetermined level the magnitude of the repellent force rises sufficiently to cause the permanent magnet means in the sealed chamber to move from a normal position to an alternate position thereby to close a switch to create an appropriate signal. The signal may merely indicate the rise of the level of the liquid to the predetermined level or the signal may operate suitable means such as a valve to terminate the rise of the liquid level.

Another problem is to provide a detection means that is constant over a wide temperature range and is not damaged by relatively high temperature rises. This problem is met by using a well known ceramic material for the permanent magnet means, the ceramic material is not affected by temperatures up to approximately 350° and if it is subjected to a higher temperature, will return completely to its normal magnetic state when the temperature drops.

In the initial embodiment of the invention, the first permanent magnet means in the sealed chamber is mounted on a pivoted arm to operate a switch and spring means incorporated in the switch construction cooperates with gravity to bias the first permanent magnet means towards its normal position. A certain problem arises in that in the mass production of highly accurate liquid level indicators, some means must be provided to compensate for variations among the switch means to permit the liquid level indicators to be calibrated for identical behavior or, if desired at any time, to permit adjustment of the liquid level to which a liquid level detector responds.

This problem of calibration and adjustment is solved by adding a third permanent magnet means to modify the effect of the magnetic force that exists between the first two permanent magnet means. The third permanent magnet means is adjacent the first permanent magnet means in the sealed chamber but has its poles turned perpendicularly of the axis of the poles of the first permanent magnet means for negligible effect on the first permanent magnet means. The third permanent magnet means may, however, have substantial effect on the first magnetic means. Thus the third magnetic means may be rotated from a first limit position where it has maximum attraction for the second magnetic means through a neutral position to a second limit position where maximum repellent force is created.

The features and advantages of the invention may be understood from the following detailed description together with the accompanying drawings.

In the drawings, which are to be regarded as merely illustrative:

FIG. 2 is a similar view with the liquid at the predetermined upper level with the result that the first permanent magnet means in the sealed chamber is at its second position;

FIG. 3 is a section along the line 3—3 of FIG. 2 showing how the third permanent magnet means may be of circular configuration with its two poles divided along a diameter of the configuration;

FIG. 4 is a wiring diagram of the circuitry controlled by the first permanent magnet means in the sealed chamber; and FIG. 5 is a diagram showing the effects of different rotational adjustments of the third calibrating permanent magnet means.

Figure 1:
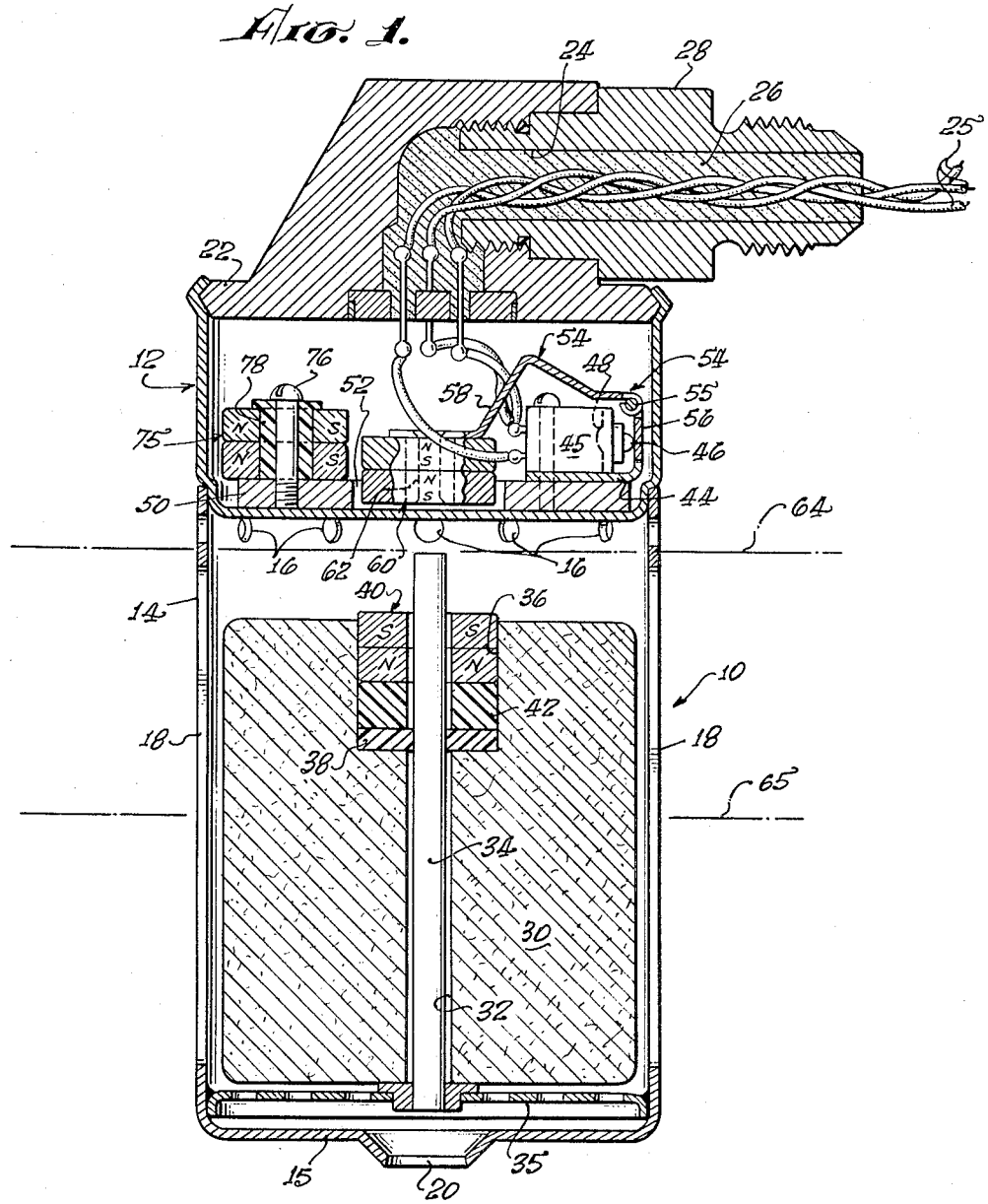
FIG. 1 is a longitudinal section view of the selected embodiment of the invention with the liquid below the predetermined level and with the first permanent magnet means in the sealed chamber in its normal first position.

The moving parts of the selected embodiment of the invention are housed in a casing which comprises a lower float cage, generally designated 10, and an upper sealed chamber, generally designated 12. In the construction shown the float cage 10 has a cylindrical peripheral wall 14 and a bottom wall 15 and is of open construction to permit free ingress and egress of liquid. For this purpose the cylindrical wall is provided with upper circumferentially spaced longitudinal slots 18, the bottom wall being provided with a central aperture 20.

The upper sealed chamber 12 is cup-shaped and is reduced in diameter near its bottom to permit the chamber to seat as a closure in the upper end of the float cage as shown. The top wall 22 of the sealed chamber 12 is a solid block of material forming an angular passage 24 for wiring, the angular passage containing three wires 25 embedded in suitable potting material 26. The angular passage 24 is formed in part by a nipple 28 whereby the device may be mounted on fixed support structure (not shown) with the wires 25 connected to external circuits. Both the float cage 10 and the sealed chamber 12 are made of non-magnetic material and preferably the sealed chamber is filled with a suitable inert gas such as nitrogen.

Mounted inside the float cage 10 for free vertical movement therein is a suitable float 30 which is suitably guided along a vertical path. In the construction shown the float has an axial bore 32 and is slidingly guided by an axial pin which extends upward from a perforated disk 35 that is suitably anchored in position at slight spacing above the bottom wall 15 of the float cage. The upper end of the float 30 is formed with an axial cavity 36 at the bottom of which is mounted an apertured disk 38 which serves as guide means that slidingly embraces the guide pin 34. The apertured disk 38 may, for example, be made of Teflon or nylon.

Also mounted in the axial cavity 36 is a ring-shaped permanent magnet means 40 which in the construction shown comprises two permanent magnets positioned face to face but may comprise a single magnet. The permanent magnet means 40 rests on an apertured spacer disk 42 made of a suitable material such as a suitable plastic. The float 30 may be made of any suitable material and preferably is made of material which will not absorb a liquid.

Mounted inside the sealed chamber 12 on an angular bracket 44 is a suitable switch 45 which preferably is a microswitch with an operating button 46 which, in a well known manner acts against a concealed spring 48 indicated by a dotted line. In the construction shown the angular bracket 44 is mounted on a circular base plate 50 of non-magnetic material, the base plate having a concentric aperture forming a well 52.

The microswitch 45 is controlled by a bell crank, generally designated 54, which is pivotally mounted on a cross pin 55 that is carried by the angular bracket 44. A relatively short downwardly extending arm 56 of the bell crank overhangs the microswitch 45 to act against the operating button 46 and the second longer arm 58 of the bell crank carries permanent magnet means 60. In the construction shown the permanent magnet means 60 comprises a pair of disk-shaped permanent magnets but, if desired, may comprise a single permanent magnet. The permanent magnet means 60 is mounted on the underside of the bell crank arm 58 by an axial rivet 62 of non-magnetic material.

The permanent magnet means 60 has what may be termed a normal first position shown in FIG. 1 at which the permanent magnet means occupies the well 52. As heretofore indicated, it is contemplated that the two permanent magnet means 40 and 60 will be positioned with confronting poles of similar polarity to create a magnetic repelling force between the two permanent magnet means. Thus as indicated in FIG. 1 the upper pole of the permanent magnet means 40 may be a south pole and the lower pole of the permanent magnet means 60 may also be a south pole.

When the liquid in which the float 30 is immersed rises to carry the float upward, the upward movement of the permanent magnet means 40 towards the permanent magnet means 60 progressively increases the repellent force between the two permanent magnet means and when the liquid rises to a predetermined upper level 64, the repellent force abruptly overcomes the downward bias of the permanent magnet means 60 which downward bias is in part gravitational and in part is a force exerted by the switch spring 48. As a consequence the permanent magnet means 60 rises with a snap action to its second position shown in FIG. 2 to cause the short arm 56 of the bellcrank to depress the button 46 for operation of the microswitch 45.

Conversely when the level of the liquid in which the float is immersed progressively drops, the progressively increasing space between the two permanent magnet means 40 and 60 causes progressive reduction of the repellent force and when the liquid drops to a predetermined lower level 65 the permanent magnet means 60 drops with a snap action to return to its normal position in the well 52 with consequent release of the button 46 to the microswitch 45.

The function of the microswitch 45 is to create electrical signals for some useful purpose such as to indicate the change in the liquid level or to operate suitable control means for regulating the liquid level. In the present embodiment of the invention the function of the microswitch 45 is to energize selectively two indicator lamps of two different colors. For this purpose the microswitch is a single-pole double-throw switch which, as indicated diagrammatically in FIG. 4, has a switch arm 66 which cooperates alternately with two contacts 68 and 70. The switch arm 66 is connected to one side of a circuit by one of the three wires 25. The other two wires 25 connect the two switch contacts 68 and 70 with indicator lamps 72 and 74 which are connected to the other side of the circuit.

For convenience the permanent magnet means 60 in the sealed chamber 12 will be referred to as the first permanent magnet means and the permanent magnet means 40 carried by the float 30 will be termed the second permanent magnet means. As heretofore indicated an important feature of the invention is the provision of a third permanent magnet means which functions as calibration means to modify the effect of the repellent force that exists between the first and second permanent magnet means.

In the present embodiment of the invention, the first and second permanent magnet means have axial poles as indicated in FIG. 1. The third permanent magnet means, which is generally designated 75, comprises a pair of dish-shaped permanent magnets which have laterally directed poles, the two poles being divided by a diameter of the configuration. The two permanent magnets that make up the third permanent magnet means 75 are preferably bonded together with their poles in phase and, obviously, a single permanent magnet may be substituted for the two permanent magnets.

The third permanent magnet means 75 is mounted on the base plate 50 by a suitable screw 76 with a spacer sleeve 78 of plastic material embracing the screw. It is apparent that the screw 76 may be loosened to permit rotational adjustment of the third permanent magnet means 75 and then the screw may be tightened to maintain the adjustment. Preferably suitable potting material (not shown) is applied to insure permanence of the calibration.

The purpose of the calibration is, of course, to cause the microswitch 45 to operate in one respect when the liquid rises precisely to the upper level 64 and to operate in the opposite respect when the liquid drops to the lower level 65. It has been found in practice that the upper level 64 may be predetermined by the third permanent magnet means with a tolerance of only .001".

The manner in which adjustment rotation of the third permanent magnet means 75 affects the repellent force between the first permanent magnet means 60 and the second permanent magnet means 40 may be understood by referring to FIG. 5 which is a diagram in which the third permanent magnet means 75 is shown in side elevation at 75 and is shown in plan at 75a, the purpose of the plan view in each instance being to indicate the rotary position of adjustment of the third permanent magnet means.

At adjustment A shown in FIG. 5, the north pole of the third permanent magnet means 75 is directed laterally towards the other two permanent magnet means but is near the level of the first permanent magnet means 60 for negligible effect thereon. The third permanent magnet means 75 is above the level of the float 30, however, for relatively great effect of the north pole of the third permanent magnet means on the second permanent magnet means 40 that is carried by the float. Since the south pole of the second permanent magnet means 40 is uppermost, the orientation of the third permanent magnet means 75 at adjustment A results in maximum magnetic attraction between the second and third permanent magnet means.

When the third calibrating permanent magnet means 75 is rotated counterclockwise slightly from adjustment A to adjustment B, its north pole is turned slightly away from alignment with the second permanent magnet means 40 with consequent lessening of the attraction force between the first and second permanent magnet means. At adjustment C the north pole of the third permanent magnet means 75 is turned to a further angle away from the second permanent magnet means 40 with further reduction in the attraction force between the third and second permanent magnet means. At adjustment D where the third permanent magnet means 75 has been rotated 90° clockwise from adjustment A the third permanent magnet means is neutral and neither attracts nor repells the second permanent magnet means 40. Adjustments E, F and G indicate continued clockwise adjustment rotation by stages of the third permanent magnet means 75 in the course of which a repellent force acting between the third permanent magnet means and the second permanent magnet means 40 progressively increases.

It is apparent that the magnetic force relationships at the various adjustments indicated in FIG. 5 accomplish the purpose of calibration by actually varying the level of the float 30 relative to the level of the liquid in which the float is immersed, i.e. by varying the degree to which the float is immersed in the liquid. If the third permanent magnet means 75 were omitted the repellent force existing between the first permanent magnet means 60 and the second permanent magnet means 40 would cause the rise of the float to lag somewhat behind the rise of the level of the liquid in which the float is immersed. The third permanent magnet means 75 has the same affect as increasing or decreasing the weight of the float at any given liquid level. Thus adjustment of the third permanent magnet means 75 varies the liquid level at which the microswitch 45 is actuated and it is because the permanent magnet means 75 may be rotated by exceedingly small increments that it is possible to predetermine the upper liquid level 64 within .001 inch.

It will be readily appreciated that the wide range of adjustment of the third permanent magnet means 75 permits a wide range of compensation for variations in the switch springs 48 whereby, in the mass production of the device, springs of widely different characteristics may be employed to obtain a constant result with respect to the switch being responsive to rise of the liquid to the predetermined level 64. Since the cost of switches in quantity with exceedingly small tolerances with respect to the force exerted by the switch springs is high and especially so if the switch springs are relied upon to determine the critical liquid level 64, whereas the cost of switches with wide tolerance is low, the provision of the compensating permanent magnet means makes it possible to produce highly precise and uniform liquid level indicators at substantial savings in cost.

An important advantage of the device is that it may be used to indicate the level of a highly corrosive liquid since the parts that are exposed to the liquid may be made of materials of high corrosion resistance and for the further reason that the moving parts that might be vulnerable to a highly corrosive liquid are completely isolated from the liquid in the sealant chamber 12.

My description in specific detail of the selected embodiment of the invention will suggest various changes, substitutions and other departures from my disclosure within the spirit and scope of the appended claims. For example, whereas the described embodiment of the invention operates with the permanent magnet means 60 and 40 oriented relative to each other to create mutual repellent force for operation of the microswitch, it will be readily apparent to those skilled in the art that the two permanent magnet means may be oriented relative to each other to create mutual attraction force for operation of the microswitch, the third calibrated permanent magnet means being effective to modify the mutual attraction force.

I claim:
1. In means to detect the arrival of a member at a given position along a given path, the combination of:
   first permanent magnet means generally aligned with the given path at a location beyond the given position and movable from a first normal position to a second position, the first permanent magnet means being biased to seek its normal first position;
   second permanent magnet means carried by the member, the first and second permanent magnet means being oriented relative to each other to create a magnetic force therebetween to cause the first permanent magnet means to move from its normal first position to its second position in response to the arrival of the member at said given position; and
   third permanent magnet means positioned for its flux to interact directly with the flux of the second permanent magnet means to modify the effect of the magnetic force between the first and second permanent magnet means, said third permanent magnet means being adjustable to vary the degree to which its flux interacts with the flux of the second permanent magnet means.

2. A combination as set forth in claim 1 in which the third permanent magnet means has poles directed laterally with respect to the orientation of the poles of the first and second permanent magnet means and is adjustable by rotation to change the direction of its poles.

3. A combination as set forth in claim 1 in which the third permanent magnet means is adjustable to a first limit position at which maximum attraction force exists between the third permanent magnet means and the second permanent magnet means and is adjustable to an intermediate position at which neither attraction force nor repellent force exists between the third and second permanent magnet means, and is adjustable to a second limit position at which maximum repellent force exists between the first and third permanent magnet means.

4. In means to detect the arrival of a member at a given position along a given path, the combination of:
   first permanent magnet means generally aligned with the given path at a location beyond the given position and movable from a first normal position to a second position, the first permanent magnet means being biased to seek its normal first position;
   second permanent magnet means carried by the member, the first and second permanent magnet means being oriented relative to each other to create a magnetic force therebetween to cause the first permanent magnet means to move from its normal first position to its second position in response to the arrival of the member at said given position;
   third permanent magnet means positioned for its flux to interact directly with the flux of the second permanent magnet means to modify the effect of the magnetic force between the first and second permanent magnet means, said third permanent magnet means being adjustable to vary the degree to which its flux interacts with the flux of the second permanent magnet means; and
   means to create a signal in response to the movement of the second permanent magnet means between its two positions.

5. A combination as set forth in claim 4 in which the signal means includes switch means operatively connected to the first permanent magnet means for actuation thereby.

6. A combination as set forth in claim 4 in which the first and second permanent magnet means are substantially in alignment with respect to the orientation of their poles and in which the third permanent magnet means is positioned with the axis of its poles substantially perpendicular to the axis of the poles of the first and second permanent magnet means.

7. In means to detect the arrival of a member at a given position along a given path, the combination of:
- first permanent magnet means generally aligned with the given path at a location beyond the given position and movable from a normal first position to a second position further removed from the given position, said first permanent magnet means being biased to seek its normal first position;
- second permanent magnet means carried by the member, the first and second permanent magnet means having confronting poles of like polarity to create mutual repellent force to cause the first permanent magnet means to move from its normal first position to its second position in response to the arrival of the member at said given position; and
- third permanent magnet means positioned for its flux to interact directly with the flux of the second permanent magnet means to modify the effect of the mutual repellant force on the first permanent magnet means, said third permanent magnet means being adjustable to vary the degree to which its flux interacts with the flux of the second permanent magnet means.

8. In means to detect the arrival of a member at a given position along a given path, the combination of:
- a hermetically sealed chamber having a wall of non-magnetic material extending across the projection of said path beyond the given position of the member;
- first permanent magnet means in said chamber generally aligned with the given path beyond the given position and movable from a normal first position to a second position further removed from said given position, said first permanent magnet means being biased to seek its normal first position;
- means in said chamber to create a signal in response to movement of the first permanent magnet means between its normal position and its second position;
- second permanent magnet means carried by the member, the first and second permanent magnet means having confronting poles of like polarity to create mutual repellent force to cause the first permanent magnet means to move to its second position in response to the arrival of the member at the given position; and
- third permanent magnet means in said chamber positioned for its flux to interact directly with the flux of the second permanent magnet means to modify the effect of the mutual repellent force on the first permanent magnet means, said third permanent magnet means being adjustable to vary the degree to which its flux interacts with the flux of the second permanent magnet means.

9. In a device for detecting the arrival of a member at a given position along a given path wherein a first permanent magnet means is located on the path projected beyond the given position and a second permanent magnet means is carried by the member, the two permanent magnet means having confronting poles of like polarity to create mutual repellent force that progressively increases as the second permanent magnet means approaches the first permanent magnet means, and wherein signaling means responds to rise of the repellent force as said member approaches the given position, the improvement comprising:
- third permanent magnet means positioned adjacent the first permanent magnet means and having laterally directed poles to cause a magnetic force to be exerted between the second and third permanent magnet means to modify the effect of said mutual repellent force.

10. An improvement as set forth in claim 9 in which the third permanent magnet means is rotatable to vary the direction of its poles relative to the first permanent magnet means.

11. Means to detect the rise of a float to a given level, comprising:
- first permanent magnet means having a normal position above the given level in general alignment with the path of movement of the float, said first permanent magnet being free to move from its normal position;
- signal means responsive to movement of the first permanent magnet means from its normal position;
- second permanent magnet means carried by the float, the two permanent magnet means being positioned to create magnetic force therebetween to cause the first permanent magnet means to move to its second position in response to rise of the float to the given position; and
- third permanent magnet means positioned for its flux to interact directly with the flux of the second permanent magnet means to modify the effect of said magnetic force on the first permanent magnet means, said third permanent magnet means being adjustable to vary the degree to which its flux interacts with the flux of the second permanent magnet means.

12. In a device for detecting the arrival of a member at a given position along a given path wherein a first permanent magnet means is located on the path projected beyond the given position and a second permanent magnet means is carried by the member, the two permanent magnet means being oriented relative to each other to create a magnetic force therebetween that progressively increases as the second permanent magnet means approaches the first permanent magnet means, switch means being operatively connected to the first permanent magnet means for actuation by movement thereof, the switch means incorporating spring means to oppose movement of the first permanent magnet means out of its normal position, the improvement to permit calibration of the device, comprising:
- third permanent magnet means adjacent the first permanent magnet means to one side thereof and located for its flux to interact directly with the flux of the second permanent magnet means, said third permanent magnet means having poles directed laterally of the orientation of the poles of the first and second permanent magnet means to modify the effect of said magnetic force on the first permanent magnet means,
- the third permanent magnet means being rotatable to vary the direction of its poles thereby to vary the degree to which it modifies said effect.

References Cited by the Examiner

UNITED STATES PATENTS

| | | | |
|---|---|---|---|
| 2,628,296 | 2/1953 | Dillman | 200—81.9 |
| 2,671,834 | 3/1954 | Kmiecik | 200—87 |
| 2,850,686 | 9/1958 | MacGeorge | 317—171 |
| 3,167,694 | 1/1965 | Bekedam | 317—201 |
| 3,187,131 | 6/1965 | Blase | 200—67 |

BERNARD A. GILHEANY, *Primary Examiner.*

B. DOBECK, *Assistant Examiner.*